July 26, 1927.
L. B. NEIGHBOUR
MANURE SPREADER
Filed Oct. 19, 1921
1,636,829
4 Sheets-Sheet 4
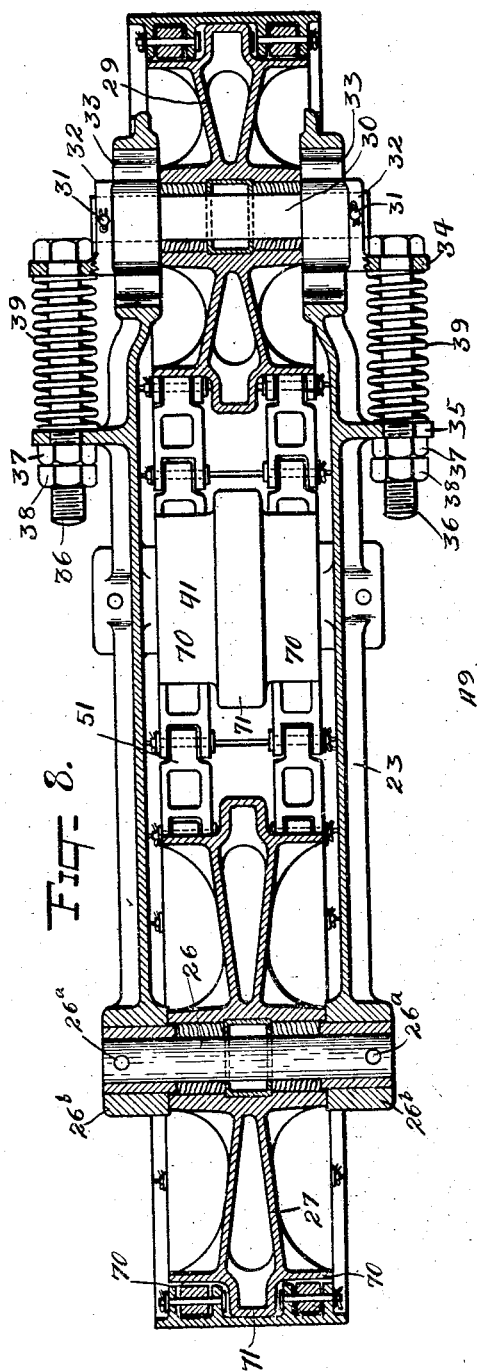
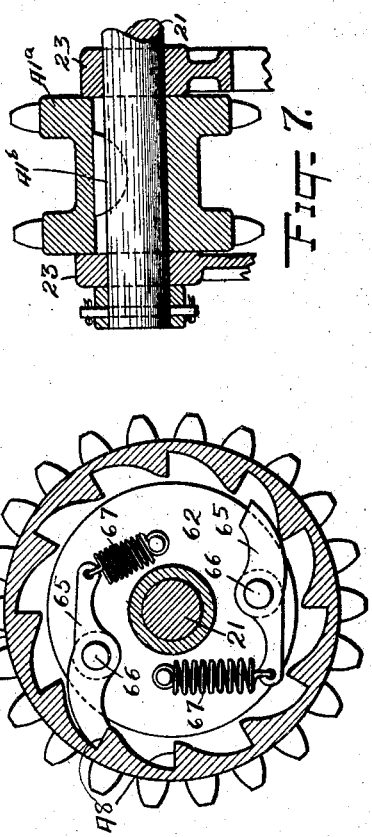
Inventor;
Leonard B Neighbor
By J.H. Bliss
Attorney
Witness;
E. Wilderson Patented July 26, 1927.

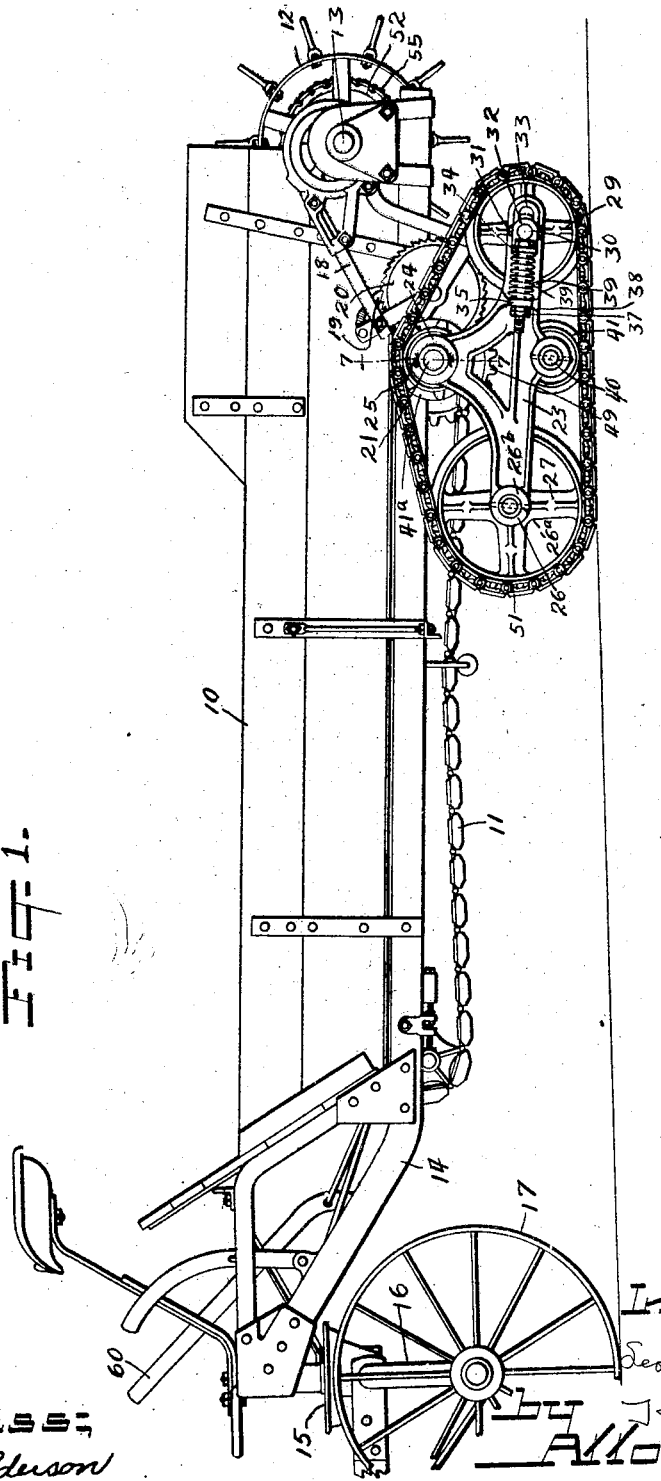

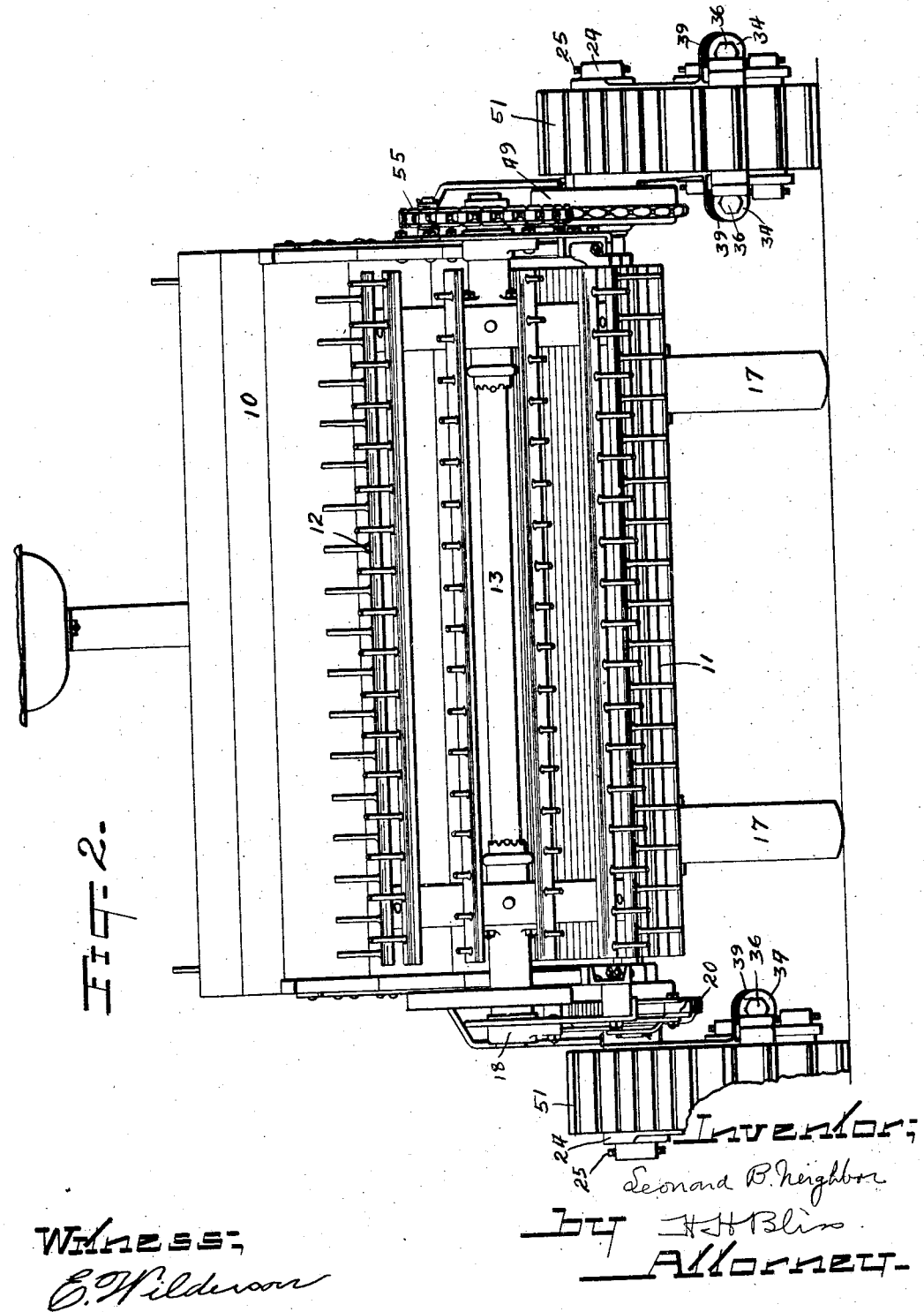

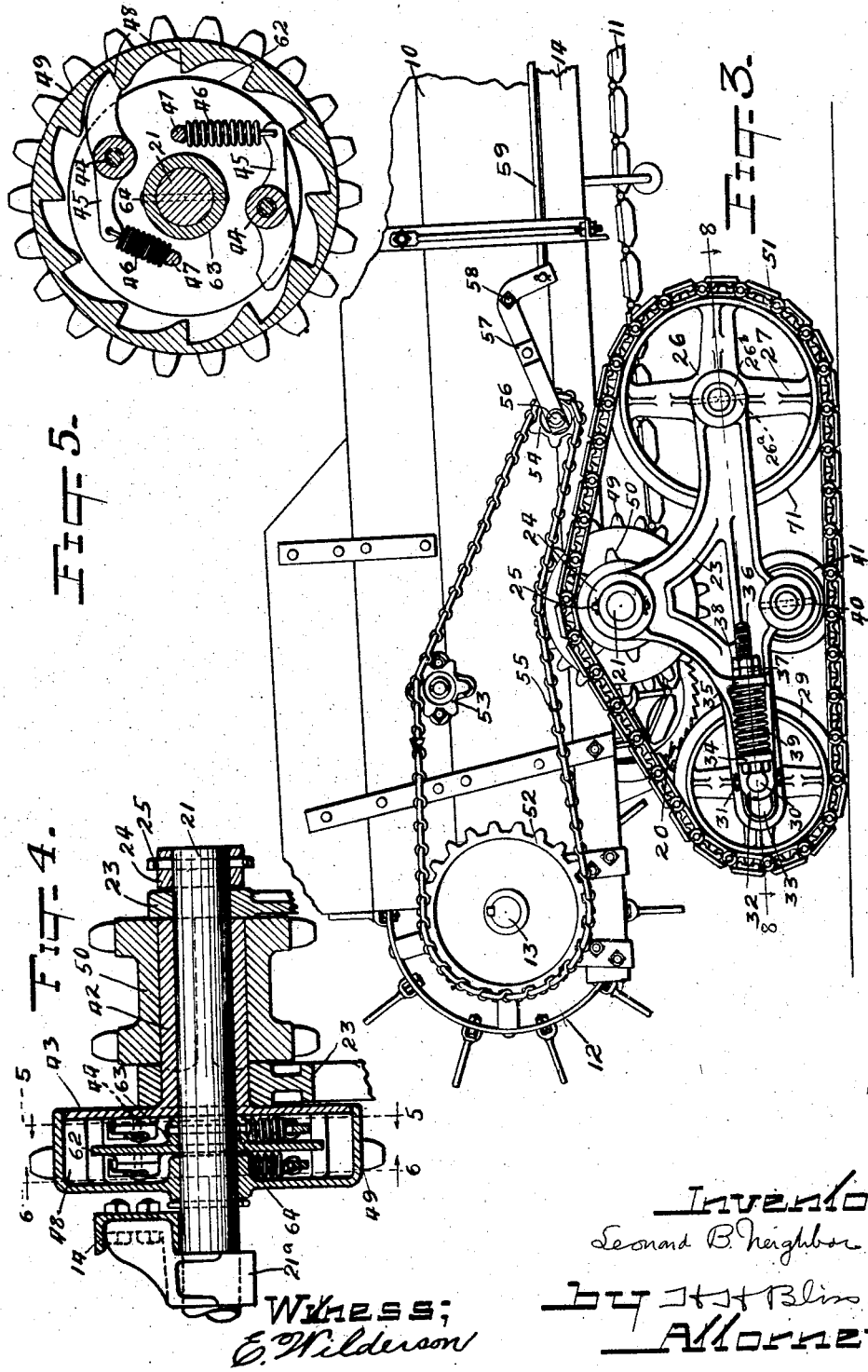

1,636,829

UNITED STATES PATENT OFFICE.

LEONARD B. NEIGHBOUR, OF MOLINE, ILLINOIS, ASSIGNOR TO DEERE & COMPANY, OF MOLINE, ILLINOIS, A CORPORATION OF ILLINOIS.

MANURE SPREADER.

Application filed October 19, 1921. Serial No. 508,703.

This invention relates to improvements in a manure spreader of the class including those where each has a relatively rapidly driven distributor element that requires constant application of a high power. This power is generally derived from circular traction wheels positioned relatively near the end of the vehicle body and actuated by the ground surface as they roll along the same under draft from animals or engines connected to the front end of the body element. The purpose, here, is to provide a traction power mechanism of greater efficiency than the circular wheels heretofore used and of which the work will be more uniformly constant, and varied to less extent by variations in the ground surface than has been the case with the circular wheels heretofore used as aforesaid.

Fig. 1 is a side elevation of my manure spreader.

Fig. 2 is a rear view of Fig. 1.

Fig. 3 is an enlarged side view showing the opposite side of the spreader illustrated in Fig. 1, and shows the means for operating the beater.

Fig. 4 is a detail view of the driving means.

Fig. 5 is a cross sectional view on line 5—5 of Fig. 4.

Fig. 6 is a vertical sectional view on line 6—6 of Fig. 4.

Fig. 7 is a vertical sectional view on line 7—7 of Fig. 1.

Fig. 8 is a horizontal sectional view on line 8—8 of Fig. 3, a few of the parts being shown in elevation.

10 is the box of a spreader as usually constructed having a movable bottom or apron 11 adapted to deliver the manure placed in the box to a beater 12 mounted on a shaft 13 at the rear of the box 10, all carried by a frame which is supported at the front end on a fifth wheel 15, and an axle 16, upon which wheels 17 are revolubly mounted. The apron 11 is operated as usual from the beater 12 by means of an eccentric 18, a pawl 19 and a ratchet wheel 20. I have described the foregoing parts in a general way as they are of usual construction and are well known in the art.

Near its rear end, and extending underneath and supported by, the frame 14 is a shaft 21 in hangers 21ª. Upon each end of the shaft 21 is freely mounted a triangular frame 23. Collars 24 and pins 25 hold the frames 23 (and other parts to be described) properly on the shaft.

Each of the frames 23 has similar parts as follows: On a short shaft 26 in one end of each frame a wheel 27 is loosely mounted. This wheel is more particularly described hereafter. The shaft 26 is held in proper position by pins 26ª which pass through the shaft and through bearing elements 26ᵇ formed on the frame. 29 is a wheel similar to that at 27, but preferably of smaller diameter, and is mounted at the opposite end of the frame, so that it is spaced a considerable distance fore and aft from the wheel 27. The wheel 29 is loosely mounted on a short shaft 30, non-rotatably held by pins 31 in bearing castings 32. The latter are slidable longitudinally in slots 33 in the arms of the frame 23. On each of the castings 32 there is a lug 34 which corresponds with a lug 35 on the frame. A bolt 36 extends through a pair of lugs 34 and 35 and is held in position by nuts 37, 38. On each of the bolts 36, between the lugs 34 and 35, is an expansion spring 39. By means of the bolts and springs the wheel 29 may be adjusted to the proper predetermined longitudinal position, and yieldingly held in said position.

Rotatably mounted on a shaft 40 carried in the lower portion of the frame 23 is a smaller wheel 41 similar in construction to the wheels 27 and 29.

Mounted on the end part of the shaft 21, outside the frame 14, and adapted to rotate on the shaft is a sleeve 42 having at its inner end a plate 43 integral therewith. On the plate 43 are studs 44 upon which are pivotally mounted dogs 45. A spring 46 is connected at one end to an arm of the dog 45 and at the other end to a pin 47 secured to the plate 43. As will be seen in Fig. 5, one end of the dog 45 is adapted to engage with internal ratchet teeth 48 integral with a sprocket wheel 49 which is revolubly mounted on the shaft 21. Upon a squared portion of the sleeve 42 and adapted to revolve therewith is a double toothed sprocket 50. It will thus be seen that when the sprocket 50 is turned in a forward direction the sleeve 42 with its plate 43 will also be revolved and the dogs 45 will be held in engagement with the ratchet teeth 48 by the springs 46, thus driving the sprocket 49. It will be evident however that the dogs 45 will release from the ratchet teeth 48 when the sprocket 50 is revolved in the opposite direction.

To insure positive driving of the spreader apparatus under all conditions, especially when sharp turns are being made either to the right or to the left, I provide for driving the sprocket wheel 49 from the rotation, in the proper direction, of either the double sprocket 50 on the right hand side of the vehicle, or from the double sprocket 41ª on the left hand side of the vehicle. To accomplish this I have shown the mechanism on the left hand side of the vehicle as being constructed similarly to that on the right hand side except that the double sprocket 41ª is keyed to the shaft 21 at 41ᵇ. Within the hollow sprocket 49 and parallel to the plate 43 is mounted a second plate 62 formed with a hub 63 and rigidly secured to the shaft 21 by means of pin 64 which passes through said hub and the shaft. The plate 62, as shown in Fig. 6, carries dogs 65 pivotally mounted on studs 66 and held in operative position by springs 67. The operation of the parts just described is similar to the operation of the corresponding elements mounted upon plate 43 as the said parts are adapted to transmit rotation from the shaft 21 to the sprocket 49. It will be seen that the devices within the sprocket 49 constitute a form of differential for positively driving the said sprocket when the vehicle is advancing rectilinearly or turning on any radius; but the sprocket remains stationary when the vehicle is being moved backward.

Mounted around the wheels 27, 29, 41 and the sprocket 50 on one side of the machine and on the other side around the wheels 27, 29, 41 and the sprocket 41ª are endless belts or tracks 51 which, together with the supporting devices therefor, serve as the ground supporting means for the rear part of the spreader by which its weight is sustained. Each of these belts consists of a pair of parallel endless chains to which are secured, on their outer faces, broad treads, the latter being adapted to engage with the ground. To properly support these chains and treads, and to maintain them in position during their travel, the wheels 27, 29 and 41 are peculiarly formed as is clearly shown in Figs. 3 and 8. Each of the wheels has two tread surfaces 70, 70 upon which the endless chains bear; and between these tread surfaces is a radially projecting part 71 of sufficient width to maintain the endless chain parts in proper position axially, and of sufficient height to aid in carrying the belt by supporting the central portions of the treads as they pass around the wheels.

The links, that constitute the endless belts 51, are adapted to engage with the teeth of the sprockets 41ª and 50, and when they are moved around their guides by the advance of the machine, which is caused by the draft means, such as horses or a tractor, they impart movement to the sprockets, which, in turn, drive the sprocket 49 as previously described. 55 is a chain meshing with the teeth of the sprocket 49, with a sprocket 52 keyed on the beater shaft 13, with an idler sprocket 53 mounted to freely rotate on a stud fastened to the box 10, and with a sprocket 54. The sprocket 54 rotates freely on a stud 56 on an L-shaped lever 57 pivotally mounted at 58 on the box 10. A rod 59 connects one end of the lever 57 with a lever 60 positioned within convenient reach of the operator when on the seat of the spreader. By means of the lever 60, the rod 59, and the L-shaped lever 57, the chain 55 may be brought into mesh with the teeth of the sprocket 49 as shown in Fig. 3 or may be disengaged from the teeth, and correspondingly the beater 12 will rotate or remain stationary as the spreader progresses over the ground.

The work is very severe which must be performed by the driven parts of a manure spreader. The load is heavy, compact and generally wet, and by its inertia resists the desired constant and uniform backward feeding movement of the bottom apron. And, particularly, this thick coherent resisting mass resists its being torn to pieces by the beater and being carried upward and thrown backward. But these operations and the required movements of the parts should be continually uniform in order that an even distribution of the material over the surface of the ground shall be attained. And for this work all of the power which is available is that derived from the circular peripheries of the ground wheels in spreaders as now ordinarily made.

And experience has shown that these circular traction wheels do not provide sufficient tractive effort to properly operate the feeder of the beater, particularly when the ground is soft or when there is any snow upon the surface, both of which conditions are common during those seasons of the year when the greater part of the spreading of manure is carried on. The wheels are constantly liable to slip and refuse to actuate the parts they are intended to drive.

These difficulties are overcome by a mechanism embodying my improvements. Because of the spacing apart of the wheels 27 and 29, the endless ground-engaging tread chains have tread sections elongated longitudinally of the machine, which (under the down-pressing weight of the body and its load) have a greatly increased traction grip on the ground. And while they are being bodily propelled by the draft of the body the elongated ground-contacting tread sections of the chains readily adjust themselves to any variations in the surface and thus constantly maintain their grip. The two tread chains on the opposite sides, respectively, of the body can vibrate or oscillate together or independently, as circumstances require, thus insuring that the one which is operatively connected to the beater shall have its tread section quickly adapt itself to the ground surface and constantly maintain tractive relation thereto. Furthermore my invention constitutes an important improvement over prior constructions in several other particulars. In manure spreads it is of great importance that the body be set as low down as possible so as to facilitate loading and the proper distribution of the load in the body by a man standing on the ground, and that the rear supports of the body be such that they will not interfere with the free access to it from the sides for loading purposes. In my improved construction these advantages are obtained since the endless chain devices which support the rear portion of the body may be so arranged as to support the body at a very low point, and they may be placed at any desired point fore and aft with relation to the rear end of the body without interfering with its being loaded from the sides since they lie wholly below the upper side margins thereof.

What I claim is:

1. The combination with a vehicle frame, and a rotary driven element mounted thereon, of means for driving said driven element comprising an endless chain having an elongated substantially straight portion engaging with the ground, front and rear wheels around which said chain travels, a frame in which said wheels are mounted and by which the weight of one end portion of the vehicle is sustained, said frame being pivoted to oscillate relatively to the vehicle frame about an axis disposed transversely thereof at one side of the axis of said driven element, a driving wheel mounted at the center of oscillation of said pivoted frame, and a driving connection between said driving wheel and said driven element.

2. The combination with a vehicle frame, and a rotary driven element mounted thereon, of means for driving said driven element comprising an endless chain having an elongated substantially straight portion engaging with the ground, front and rear wheels around which said chain travels, a frame in which said wheels are mounted and by which the weight of one end portion of the vehicle is sustained, said frame being pivoted to oscillate relatively to the vehicle frame about an axis disposed transversely thereof at one side of the axis of said driven element, a sprocket wheel mounted at the center of oscillation of said pivoted frame and driven by said endless chain, and a sprocket wheel and chain driving connection between said sprocket wheel and said driven element.

3. The combination with a vehicle frame, and a rotary driven element mounted thereon, of means for driving said driven element comprising an endless chain having an elongated substantially straight portion engaging with the ground, front and rear wheels around which said chain travels, a frame in which said wheels are mounted and by which the weight of one end portion of the vehicle is sustained, said frame being pivoted to oscillate relatively to the vehicle frame about an axis disposed transversely thereof at one side of the axis of said driven element, a sprocket wheel mounted at the center of oscillation of said pivoted frame, a sprocket wheel mounted on the vehicle frame coaxially with said driven element and operatively connected therewith, and a chain mounted on the vehicle frame and operatively connecting said sprocket wheels.

In testimony whereof, I affix my signature.

LEONARD B. NEIGHBOUR.